United States Patent [19]

Ashworth et al.

[11] 3,725,569

[45] Apr. 3, 1973

[54] COLOR FACSIMILE TRANSMISSION SYSTEM

[75] Inventors: John Vernon Ashworth, Oxshott; John Hugh Smith, Chorley Wood, both of England

[73] Assignee: IPC Services Limited, London, England

[22] Filed: Feb. 16, 1971

[21] Appl. No.: 115,163

[30] Foreign Application Priority Data

Feb. 24, 1970 Great Britain....................8951/70

[52] U.S. Cl. ..............................178/5.2 A, 178/5.2 R

[51] Int. Cl. ..............................H04n 9/02, H04n 1/46

[58] Field of Search ..........................178/5.2 R, 5.2 A

[56] References Cited

UNITED STATES PATENTS

| | | | |
|---|---|---|---|
| 2,879,326 | 3/1959 | Yule | 178/5.2 A |
| 3,100,815 | 8/1963 | Drake et al. | 178/5.2 A |
| 3,002,048 | 9/1961 | Bailey et al. | 178/5.2 A |
| 3,529,078 | 9/1970 | Murata | 178/5.2 A |
| 2,297,461 | 9/1942 | Dillenburger | 178/DIG. 28 |
| 2,949,500 | 8/1960 | Shepard | 178/DIG. 28 |

*Primary Examiner*—Robert L. Richardson
*Attorney*—Holcombe, Wetherill & Brisebois

[57] ABSTRACT

A color transmission system is described for transmitting information representing color separations to a remote point at which the separations are reproduced in a form suitable for making printing plates for reproducing a color picture. A color transparency is scanned by a moving light spot and the light passed by the transparency is directed through a filter for each color component and on to a light sensitive device producing an electrical output signal. The electrical signals representative of the color components are transmitted either sequentially or simultaneously to one or more facsimile receiving devices for producing a facsimile image of each of said color components. The system may include color balance circuits and color correction circuits as well as means for generating a black overprint signal.

10 Claims, 11 Drawing Figures

Inventor

By

Attorney

Inventor

By

Attorney

*Inventor*

*By*

*Attorney*

Inventor

By

Attorney

Inventor

By

Attorney

Inventor

By

Attorney

COLOR FACSIMILE TRANSMISSION SYSTEM

Figures 1, 2:
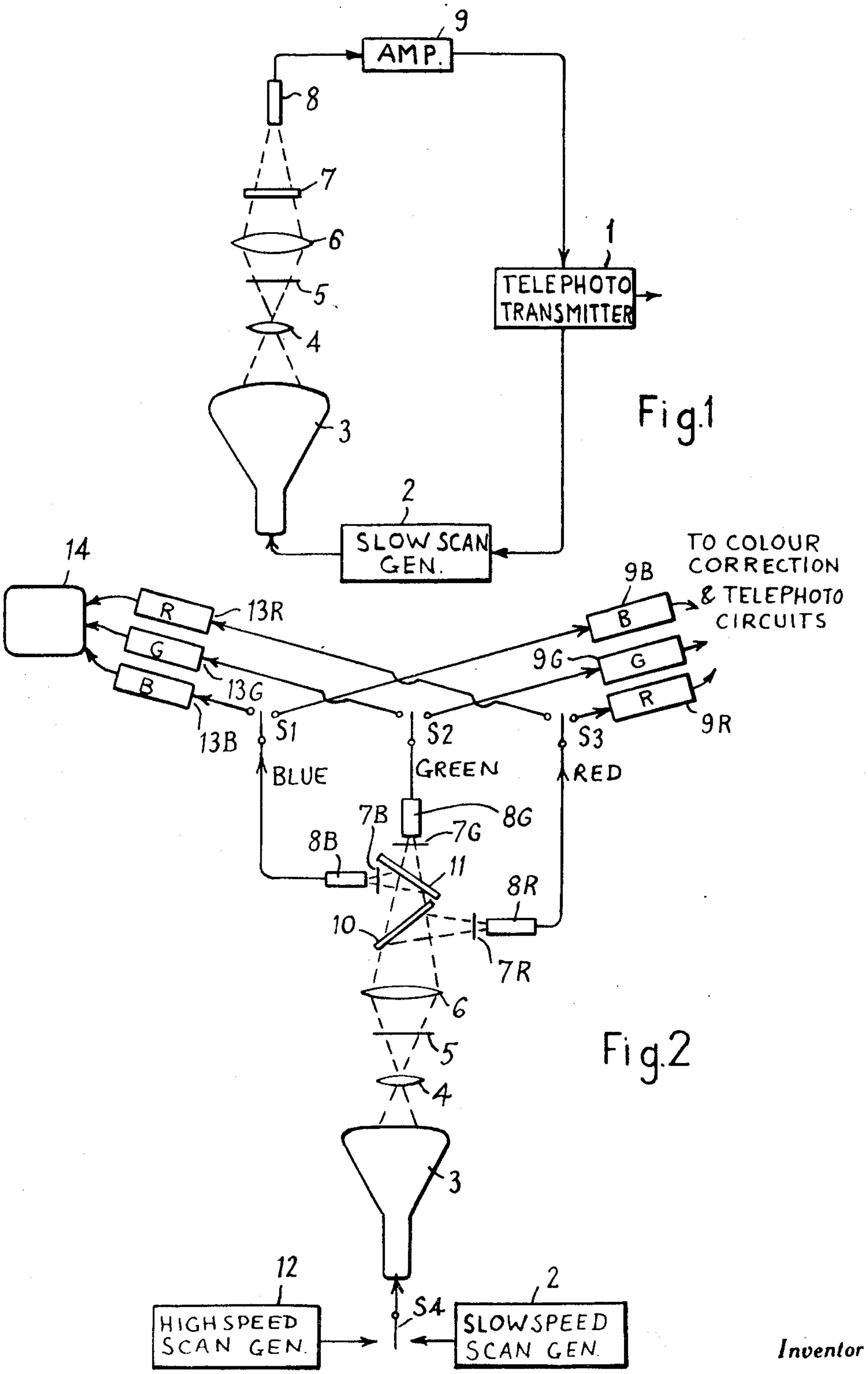

The present invention relates to a color transmission system and more particularly to means for transmitting information representing color separations of a color picture to a remote point at which the separations can be reproduced.

The invention provides a color transmission system for transmitting to a remote point a series of signals representing the color components of a color transparency, comprising means for scanning the transparency with a moving light spot, means for directing the light passed by the transparency through a filter for each of the color components and on to a light sensitive device producing an electrical output signal, means for transmitting the electric signals representative of the color components and means for feeding said electrical signals to a facsimile receiving device for producing a facsimile image of each of said color components.

The filter for each color component may be positioned in the light path sequentially and the transparency scanned overall by the light spot for each filter, whereby signals representing the different color components are produced in sequence and fed sequentially to the facsimile receiving device.

Alternatively, the light passed by the transparency may be fed through a beam splitting device to split the light beam into a plurality of paths, each of which is directed through a filter representing one of the color components and which has associated with it a light sensitive device, whereby signals representing two or more color components can be produced simultaneously. These signals can either be fed sequentially to a single facsimile receiving device or simultaneously to a plurality of facsimile receiving devices.

Preferably the light passed by the transparency is split into red, blue and green color components.

The color transparency may be either a positive or negative photographic transparency of a picture or image, or a transparency produced by any other means, such as printing or staining on a transparent base.

The scanning means may consist of a cathode ray device operating as a flying spot scanner or of a mechanical scanning device such as a mirror drum scanner. If desired, a combination of cathode ray beam and mechanical scanning may be used, in which a single line scan is generated on the screen of a cathode ray tube and the transparency is mechanically deflected to cause the line scan to scan the area of the transparency. The light sensitive devices may be photoelectric devices, e.g., photo multipliers.

The facsimile receiver for reproducing the transmitted color component signals may be a telephoto receiver producing either positive or negative pictures which are employed to produce printing plates from which a facsimile of the transparency is produced, e.g., by printing in cyan, yellow, magenta and black. The polarity of the images can be reversed by reversing the polarity of the electric signals within the system.

Preferably the scanning means operates to produce a linear scanning raster. The scanning rate may, for example, be two lines per second and such as to produce one hundred scans per inch at the facsimile receiver. With such an arrangement the facsimile receiver takes 8.3 minutes to reproduce a 10 × 10 inch facsimile image of a color component.

The scanning means may also be arranged to operate at a higher scanning speed at which the output signals from the light sensitive devices are fed through appropriate circuits to energize a color television type picture reproducing device in order to monitor the signals prior to being transmitted.

The arrangement may also include adjustable color balance circuits and color correction circuits to enable the color component signals transmitted to be selectively adjusted.

According to a further feature of the invention, the means for scanning the transparency with a moving light spot comprises means for selectively changing the scanning speed between a relatively slow speed at which color component signals are produced for generating the facsimile images, and a relatively high speed at which color component signals are produced for modulating the cathode ray beam of a television type monitor.

Figure 3:
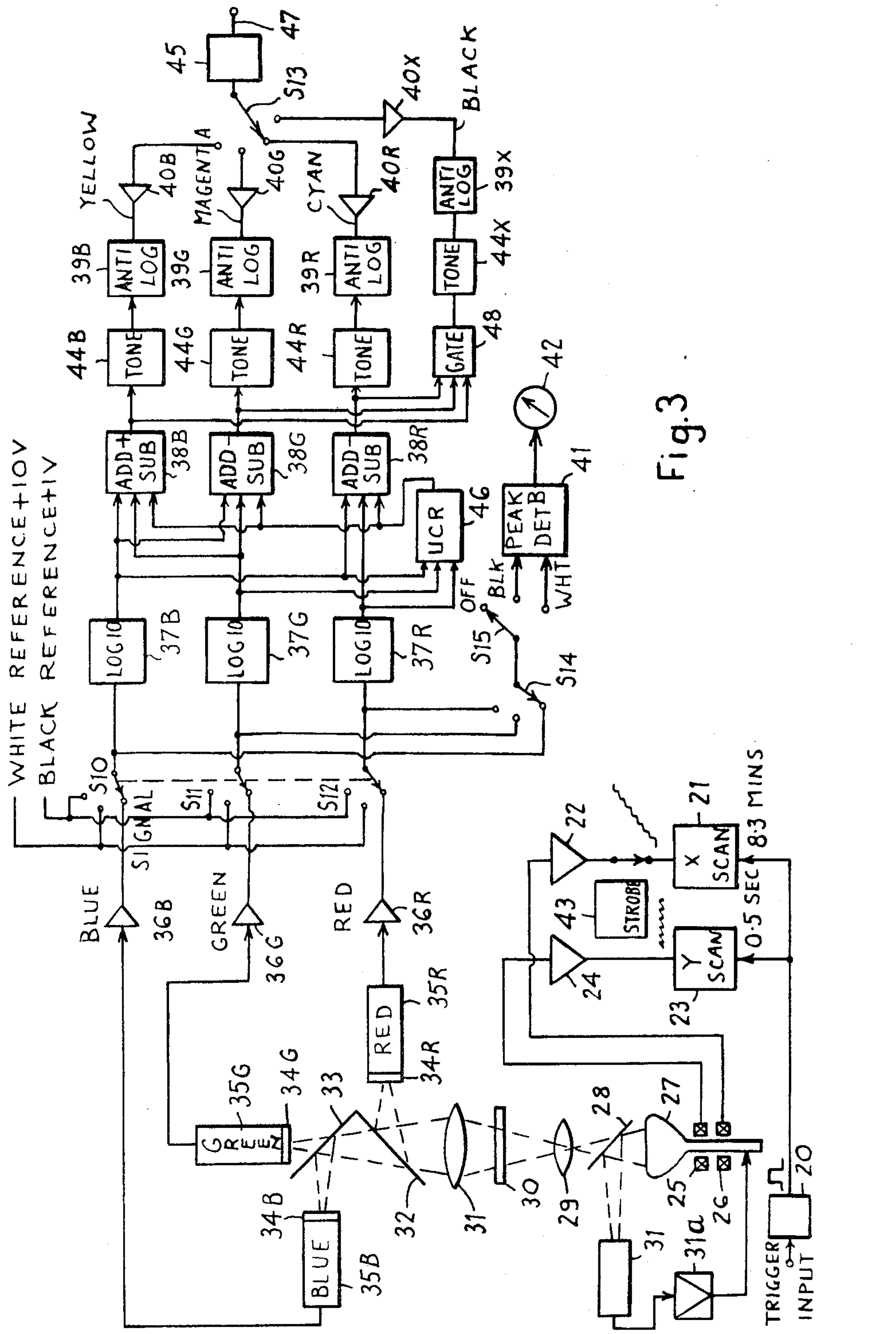

The invention will now be further described, by way of example, with reference to the accompanying drawings, in which FIG. 1 is a simplified block diagram of one embodiment of the invention, FIG. 2 is a simplified block diagram of a second embodiment, FIG. 3 is a block diagram of a third embodiment; and FIGS. 4 to 11 are circuit diagrams of various of the circuits employed in the system of FIG. 3.

Referring to FIG. 1, the arrangement comprises a telephoto facsimile transmitter 1 which produces synchronizing signals for a slow speed scan generator 2 controlling the deflection of the cathode ray beam of a cathode ray tube 3 operating as a flying spot scanner. The light spot moves across the face of the cathode ray tube according to a raster pattern and light from the spot is focussed by a lens system 4 onto a photographic transparency 5, so that the light spot scans across the transparency. The light passing through the transparency 5 is collected by a condenser lens system 6 and passes through a filter 7, which may be red, green or blue, on to a photocell 8. The photocell produces an electric signal which is amplified by the amplifier 9 and fed to the telephoto facsimile transmitter from where it is transmitted to a remote telephoto receiver. In order to transmit the whole color information of a color transparency, the latter is scanned three times, using a different color filter 5 (red, blue or green) at each scan. The three separations produced at the telephoto receiver by the three sequentially transmitted signals are employed to produce printing plates which are printed in cyan, yellow and magenta to reproduce a facsimile of the original picture on the transparency. In practice, a true facsimile would only be produced by perfect printing inks in cyan, magenta and yellow, and since such inks are not available the quality of the facsimile reproduced depends on the imperfections in the printing inks. These imperfections can be corrected at the receiver by using the received pictures to make correction masks from which the color corrected separations are derived.

FIG. 2 shows an arrangement enabling three color component signals to be produced simultaneously. The light spot from the cathode ray tube 3 passes through the lens system 4, transparency 5 and condenser 6 as previously. However, in this embodiment the light beam is now split into three paths by two dichroic mirrors 10 and 11. The light reflected by the mirror 10 passes through a red filter 7R to a photocell 8R producing an electrical signal representing the red component. The light passing through the mirror 10 but reflected by the mirror 11 passes through a blue filter 7B to a photocell 8B producing an electrical signal representing the blue component. The light passing through the mirror 11 passes through a green filter 7G to a photocel 8G producing an electrical signal representing the green component.

The color component signals are fed via changeover switches S1, S2 and S3 to the blue, green and red signal amplifiers 9B, 9G and 9R whose output is used to modulate a composite carrier system using single sideband and transmitted to a receiver capable of carrying out color correction and color balance, then reproducing the color separations from which the printing plates are formed. Alternatively, the three signals from the amplifiers can be fed to color balance and correction circuits prior to transmission. A black overprint signal can either be derived from the signals at the transmitter or at the receiver.

The slow speed scan generator 2 controlling the production of the scanning raster on the cathode ray tube 3 is fed to the tube deflection circuits through a changeover switch S4. This switch is ganged to the switches S1, S2 and S3 and when the switches are changed to their other position, a high speed scan generator 12 is connected to produce a high speed scanning raster on the cathode ray tube 3, whilst the output signals from the photocells are fed through respective amplifiers 13B, 13G and 13R to modulate the cathode ray beam of a television type color monitor 14.

This arrangement enables the color picture produced on the monitor to be exmained and the information obtained therefrom can be employed to make necessary corrections to the color signals in the transmission (telephoto) channels, whereafter the switches S1 to S4 may be operated to initiate the slow scan and the transmission of signals via the telephoto transmitters.

Referring now to the embodiment of FIG. 3, triggering pulses, which may be derived from a facsimile transmitter 45, are fed through the pulse shaper circuit 20 to the scan generator circuits comprising an X-scan generator 21 and associated deflection amplifier 22; and a Y-scan generator 23 and associated deflection amplifier 24. The outputs from the deflection amplifiers are fed to the deflection coils 25, 26 surrounding the neck of the cathode ray tube 27, operating as a flying spot scanner, in order to generate the scanning raster. The Y-scan generator has a repetition rate of either 1.0 or 0.5 seconds and the X-scan generator has a scanning time of approximately 8.3 minutes.

The light spot from the cathode ray tube 27 passes through a dichroic or part reflecting mirror 28 and is focussed by a lens system 29 onto the photographic transparency 30 so that the light spot scans across the transparency. A small proportion of the light is reflected by the mirror 28 and impinges on photocell 31 whose output is fed through an amplifier 31*a* to a gun electrode of the tube 27 to operate as a brilliance control for the light spot.

The light passing through the transparency 30 is collected by a condenser lens system 31 and impinges on the dichroic mirrors 32 and 33. The light reflected by the first mirror 32 passes through a red filter 34R to a photomultiplier 35R producing an output signal representing the red component. The light passing through the mirror 32 but reflected by the mirror 33 passes through a blue filter 34B to a photomultiplier 35B producing an electrical signal representing the blue component. The light passing through the mirror 33 passes through a green filter 34G to a photomultiplier 35G producing an electrical signal representing the green component. The outputs from the three photomultipliers are respectively fed to the color balance amplifiers 36R, 36B and 36G. These amplifiers serve to adjust the highlight and shadow levels, otherwise referred to as the 'white' and 'black' levels, of the three color channels with minimum interaction between them.

The outputs from the color balance amplifiers are respectively fed through the changeover switches S10, S11 and S12, to color correction circuits 37, 38, 44, 39 (B, G or R) for each color channel. The purpose of the color correction system is to correct for deficiencies in the printing inks employed for printing the reproduced image. The system is an analogue of a photographic masking process employed. The photographic masks are a function of the logarithm to the base ten of the light transmittance signals and each circuit 37B, 37G, 37R gives $\log_{10}(100\%/T\%)$ (where T is the percentage light transmittance) to convert the transmission signals into density signals. The output of each of these circuits is fed through an operational amplifier 38B, 38G, 38R, acting as an adder-subtractor. The adder-subtractor operational amplifiers act together with the black undercolor removal control circuit 46 to provide the electronic masking systems. The circuit 46 comprises a peak level gate followed by a clipper circuit and an emitter follower stage. The output from each adder-subtractor is fed through a tone correction generator and density level setting unit 44B, 44G, 44R whose output feeds an anti-log circuit 39B, 39G, 39R in order to reproduce an inverse function of the $\log_{10}$ circuit and give a transmission signal which is required to drive the facsimile transmitter circuits. The output signals represent yellow, magenta and cyan respectively for the blue, green and red channels. The output signals are applied through operational amplifiers 40B, 40G, 40R, which match the balanced color channel outputs to the transmitter circuits. The amplifier outputs feed the fixed contacts of a selector switch S13, whose moving contact is connected to a facsimile transmitter 45 which is used to send phasing signals and modulate the color signals for transmission over a line 47 to a distant telephoto facsimile receiver (not shown). The selector switch is operated to transmit the three color signals in sequence followed by a black overprint signal. Alternatively, the switch could be omitted and the yellow, magenta and cyan signals could be transmitted simultaneously by modulating a composite carrier system using a single sideband. In such a case the black overprint signal is derived at the receiver. It will be understood that the facsimile transmitter 45 may also be employed independently in its normal same size mode of operation to transmit signals representing black and white pictures or images.

The system also includes a peak detector 41 operating a meter 42 to set the peak white and black levels (highlight and shadow levels) of each color channel to specific limits and thereby control the color balance of reproduction. To this end, the scan generator circuit includes strobe circuit 43 producing a single line strobe which can be moved across the transparency 30 in order to find highlight and shadow areas. To facilitate this operation, an image of the transparency may be projected on to a ground glass screen. The peak detector can be selectively connected to each color channel through switch S14 and the black or white level selected by means of switch S15. In this embodiment, the white reference level is set at 10 volts and the black reference level at 1 volt and the peak detector can be switched to each of these reference levels for each channl through S14 in conjunction with S10, S11 and S12.

The system further includes a black printer (overprint) circuit 48, 44X, 39X, 40X, connected to the output line through the selector switch S13 and which is fed with the outputs from the color correction amplifiers. Since three-color reproduction with practical ink does not print a very good black and will only reproduce a reasonable black when conditions are very carefully controlled, the addition of a black printer (overprint) signal compensates for inherent losses of the printing system. The circuit 48 is a peak level gate feeding an operational amplifier, the circuit 44X is a further tone correction generator and density setting unit and the circuit 39X is a further anti-log circuit. The overall circuit arrangement operates such that black is produced whenever there are equal amounts of cyan, magenta and yellow signals.

Figure 4:
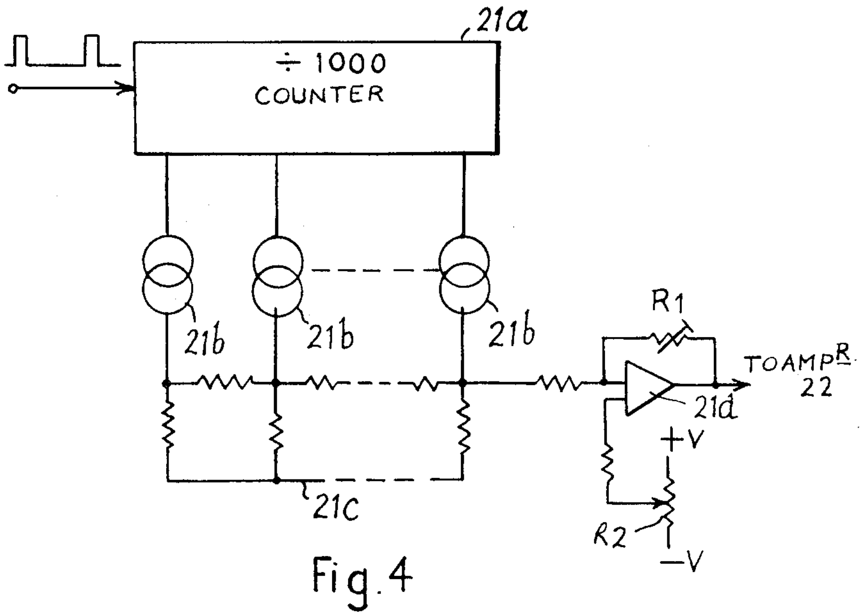

FIG. 4 is a circuit diagram of the X-scan generator 21 which is intended to produce a linear scanning of the beam of the flying spot scanner in a time of 8.3 minutes. The generator comprises a 10 stage divide-by-1000 counter 21*a* which is triggered by pulses from the facsimile transmitter. The output from each stage of the counter drives a current generator 21*b* whose outputs are connected to a 10-stage ladder network 21*c*. The output voltage of the ladder network is *v* from the first stage, 2*v* from the second stage, 4*v* from the third stage, up to 512*v* for the final stage. The network is so designed that these output voltages are added together producing a maximum of 1023*v* for the 10th stage. The output from the ladder network is thus a ramp or staircase waveform which is fed through an operational amplifier 21*d* producing a linear scan waveform applied to the deflection amplifier 22 feeding the deflection coils 26 of the flying spot scanner tube 27. The control R1 adjusts the amplitude of the scan, and the control R2 adjusts the position of the scan.

Figure 5:
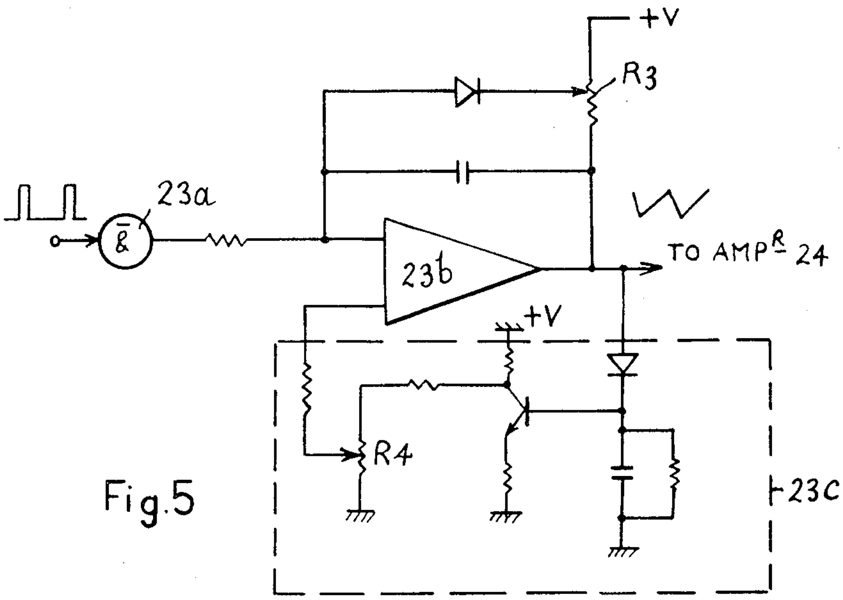

FIG. 5 is a circuit diagram of the Y-scan generator 23 which produces a linear scan in a time of 0.5 seconds having a very stable amplitude and slope. Input triggering pulses, stabilized in amplitude by the NAND gate 23*a* are fed to an integrated circuit comprising an operational amplifier 23*b* incorporating feedback. The starting level for the scan is set by the DC feedback potentiometer R3 and the amplitude and slope of the scanning waveform is stabilized by a peak detector 23*c* whose output potentiometer R4 controls the aiming potential. The output is fed to the deflection amplifier 24 feeding the deflection coils 25 associated with the flying spot scanner tube 27.

Figure 6:
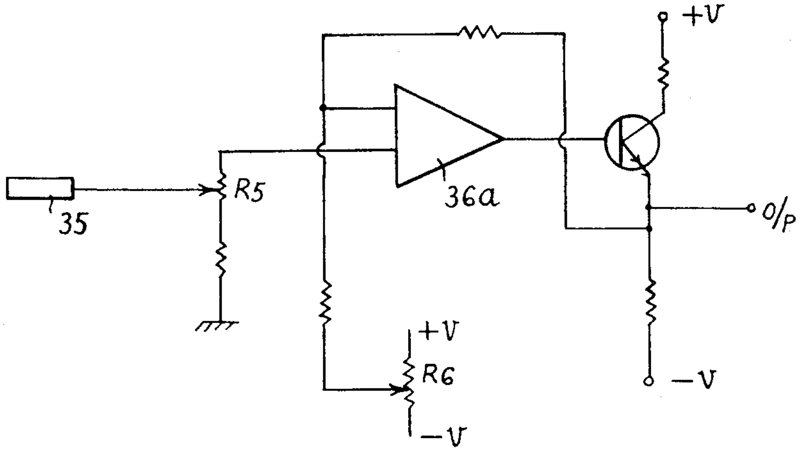

FIG. 6 is a circuit diagram of a color balance amplifier 36 which adjusts the black and white levels (highlight and shadow levels) of the three color channels with minimum interaction between them. The circuit comprises an operational amplifier 36*a* having an input fed with the output of the associated photomultiplier 35 via a potentiometer R5 which sets the white level. The black level and offset control are combined in the potentiometer control R6 and the gain is varied by employing the fact that a photomultiplier is a current generator. The load presented to the photomultiplier 35 is varied without changing the circuit impedances or gain of the amplifier. In this embodiment, the feedback amplifier is set for 10-times gain and the load presented to the photomultiplier cell is varied over a ratio of 6:1, giving a 6:1 change in gain.

Figure 7:
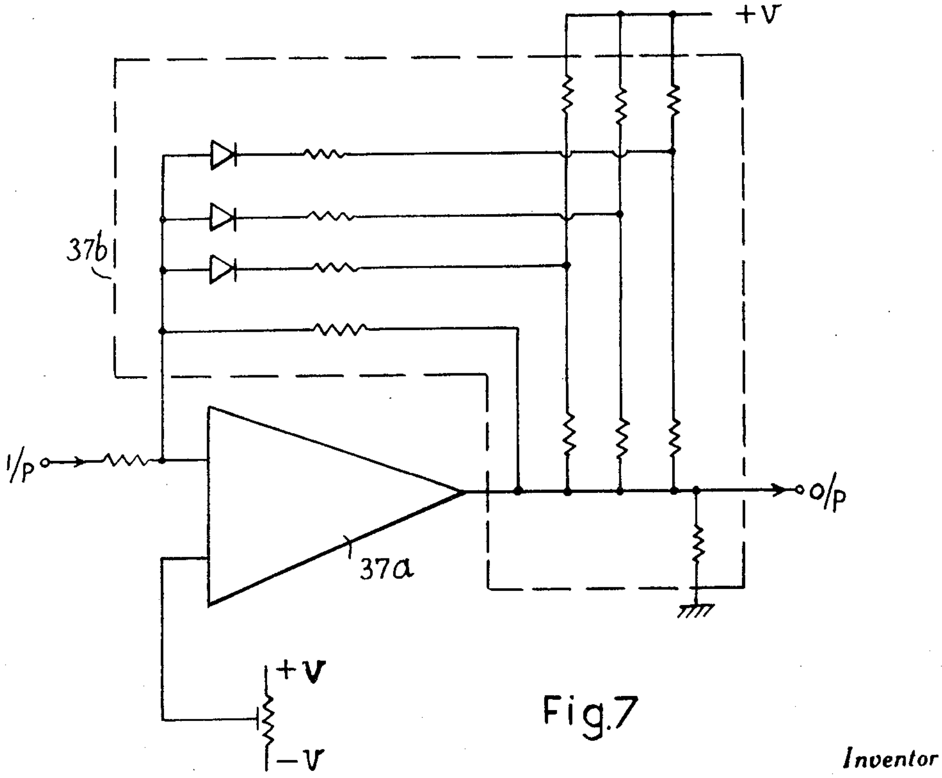

FIG. 7 is a circuit diagram of an operational amplifier 37*a* forming part of the color correction system in each channel. The photographic masks are a function of the logarithm to the base 10 of the light transmittance signals and the circuit operates by design of the network 37*b* to give $\log_{10}$ over two decades to convert the transmission signals into density signals. A basically similar circuit configuration is also used for the tone correction and density setting units 44 (B, G, R and X).

Figure 8:
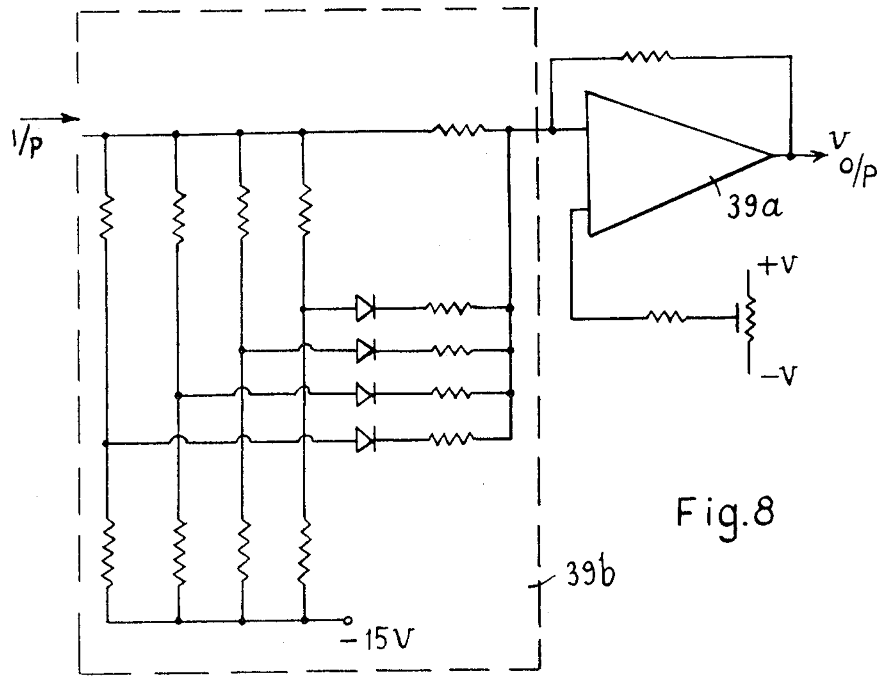

FIG. 8 is a circuit diagram of an operational amplifier 39*a* forming a further part of the color correction system in each channel. The circuit operates in conjunction with the network 39*b* to form an anti-log circuit producing an anti-logarithm and provides a signal to drive the facsimile transmitter circuits.

Figure 9:
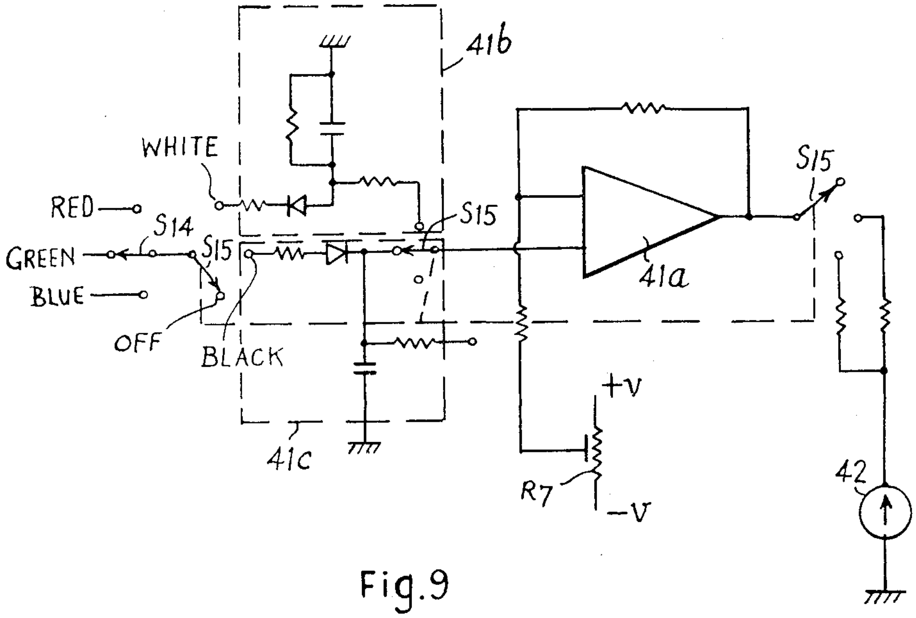

FIG. 9 is a block circuit diagram of the peak detector circuit 41 employed for color balance adjustment. The circuit operates to set the black and white limits of each color channel to specific limits which in turn controls the color balance of reproduction. The circuit includes in operational amplifier 41*a* whose input is fed via switches S14 and S15 from the three color channels. S15 is a three-section switch, of which the first two sections select either the white input network 41*b* or the black input network 41*c* to be connected to the amplifier input. The third section connects the amplifier output to the indicating meter through different resistors. The meter 42 set to zero and the offset is adjusted by potentiometer R7.

Figure 10:
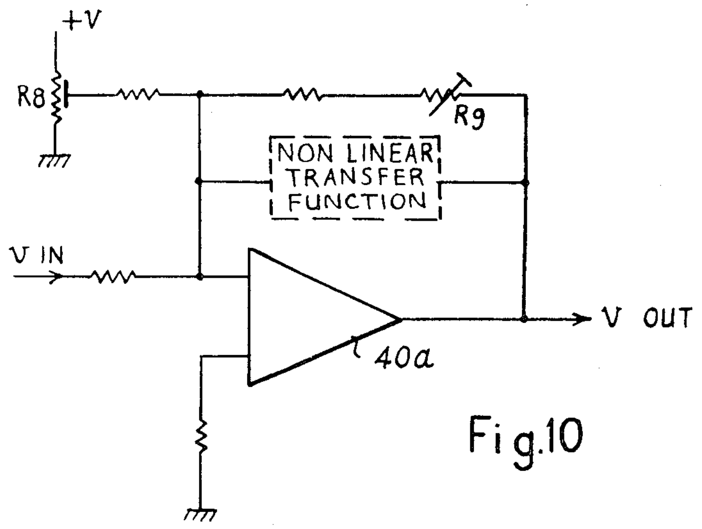

FIG. 10 is a block circuit diagram of a circuit 40 to set the balanced color channel outputs to a specific density range. This comprises an operational amplifier 40*a* with start and finish density adjustments. The potentiometer R8 is the set black control and the potentiometer R9 is the set white control. A non-linear transfer function is employed in this circuit which in practice compensates for printer characteristics.

Figure 11:
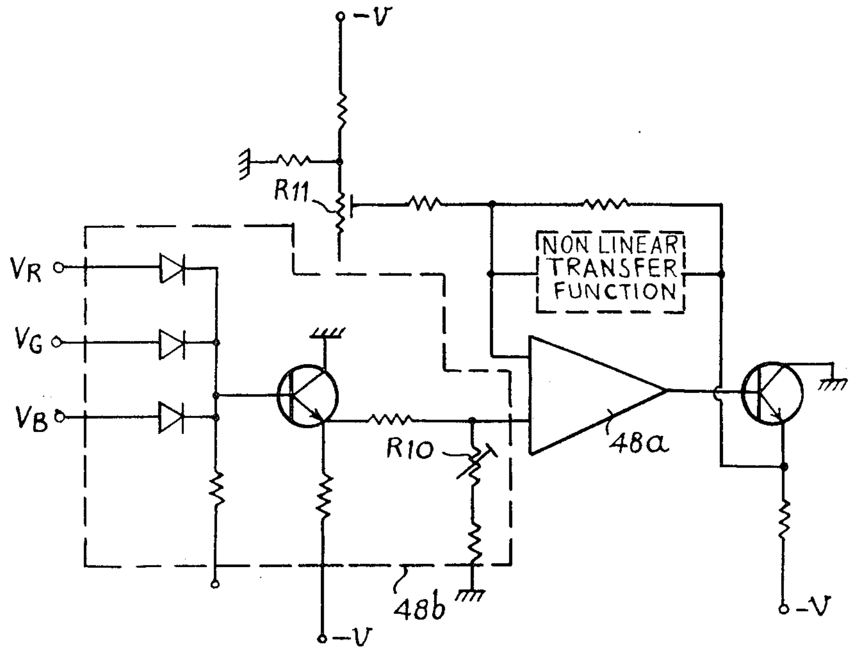

FIG. 11 is a block circuit diagram of the black gate circuit 48 incorporating an operational amplifier 48*a*. The circuit is fed with the output signals from the color correction amplifiers 38B, 38G and 38R through the network 48*b* and operates to give an output in which corresponds to black. The highlight and shadow levels can be adjusted respectively by the potentiometers R10 and R11.

In all the embodiments described the color signals may be transmitted sequentially either over a line, e.g., a telephone line, or on a radio carrier wave. The signals may alternatively be transmitted simultaneously over separate channels or combined for transmission over a single channel.

The systems according to the present invention are particularly suitable for transmitting news pictures from color transparencies over telephone lines to one or more facsimile receivers. In this connection, the systems have been specifically designed for use with standard telephoto receivers. The received signals are reproduced on a telephoto receiver as normal black and white images representing the color separation components.

At the start and finish of a transmission, signals are fed to the receiver which represent the highlight and shadow densities. These signals are recorded in marginal regions of a picture and serve as process control standards which show up errors in the signal transmission path and processing. Corrective action is effected at the half-tone screening stage prior to making the printing plates from the received images.

We claim:

1. A color transmission system for transmitting to a remote point a series of electrical signals representing the color components of a color transparency, said system comprising a facsimile transmitter capable of transmitting electrical signals representing continuous tones of a photographic image, scanning means synchronized to said facsimile transmitter for scanning the transparency with a moving light spot, means for directing the light passed by the transparency through a different filter for each of the color components, a photoelectric device associated with each filter for receiving the light of the color component passed by that filter and producing an electrical output signal representative of that color component, means for modifying the electrical signals for each color component to take into account the characteristics of a subsequent printing process, means for feeding to said facsimile transmitter, said modified electrical signals representative of the color components required to produce a printed reproduction of said original color transparency, a facsimile receiver located at said remote point for reproducing a facsimile image of each of said color components, and a signal channel connecting said facsimile transmitter to said facsimile receiver for the passage of said modified electrical component signals from said transmitter to said receiver.

2. A system as claimed in claim 1, including a beam splitting device to split the light passed by the transparency into a plurality of paths, each of which is directed through a filter representing one of the color components onto the associated photoelectric device.

3. A system as claimed in claim 1, wherein said modified electrical signals are fed sequentially to the facsimile receiver.

4. A system as claimed in claim 1, wherein the scanning means consists of a cathode ray device operating as a flying spot scanner.

5. A system as claimed in claim 1, wherein the scanning means operates at a relatively slow speed and the color component signals so produced are employed for generating facsimile images and said scanning means is also arranged selectively to operate at a higher scanning speed at which the output signals from the photoelectric devices are fed to energize a color television picture reproducing device in order to monitor the signals prior to being transmitted.

6. A system as claimed in claim 1, including means for generating a black overprint signal in order to compensate for imperfections in the printing inks employed to print a reproduction of the received image.

7. A system as claimed in claim 6, in which the color component signals are transmitted sequentially and the black overprint signal is derived from the signals at the facsimile transmitter and is transmitted as an additional signal in the sequence.

8. A system as claimed in claim 1, wherein the photoelectric device producing each electrical color component signal comprises a photomultiplier tube producing an electrical output signal representing that color component and said output signal is fed to a color balance amplifier, the output of said color balance amplifier feeding color correction circuits operating to correct for deficiencies in the printing inks employed to printing the reproduced image, and an amplifier fed from the output of the color correction circuits to match the balanced color channel outputs to the signal transmission channel.

9. A system as claimed in claim 8, wherein the color correction circuits comprise a logarithm to base 10 circuit feeding an adder-subtractor circuit and wherein the output from the adder-subtractor circuit feeds an anti-log circuit.

10. A color transmission system for transmitting to a remote point a series of electrical signals representing the color components of a color transparency, said system comprising A facsimile transmitter capable of transmitting electrical signals representing continuous tones of a photographic image, scanning means synchronized to said facsimile transmitter for scanning the transparency with a moving light spot, means for directing the light passed by the transparency through red, green and blue filters to produce the respective color components, a photoelectric device associated with each filter for receiving the light of the color component passed by that filter and producing an electrical output signal representative of that color component, means for modifying the electrical signals for each color component to take into account the characteristic of a subsequent printing process, means for feeding to said facsimile transmitter said modified electrical signals representative of cyan, magenta and yellow respectively for the red, green and blue color components as required to produce a printed reproduction of said original color transparency, a facsimile receiver located at said remote point for reproducing a facsimile image of each of said color components, and a signal channel connecting said facsimile transmitter to said facsimile receiver for the passage of said modified electrical color component signals from said transmitter to said receiver.

* * * * *